United States Patent
Luguern et al.

(10) Patent No.: US 7,054,269 B1
(45) Date of Patent: May 30, 2006

(54) CONGESTION CONTROL AND TRAFFIC MANAGEMENT SYSTEM FOR PACKET-BASED NETWORKS

(75) Inventors: Jean-Pierre Luguern, St Etienne de Montluc (FR); Michel Accarion, Nantes (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 08/941,236

(22) Filed: Sep. 30, 1997

(30) Foreign Application Priority Data

Oct. 1, 1996 (FR) .................................. 96 11940

(51) Int. Cl.
*H04J 1/16* (2006.01)
(52) U.S. Cl. ....................................... 370/232; 370/412
(58) Field of Classification Search ................ 370/232, 370/233, 234, 412, 413, 415
See application file for complete search history.

(56) References Cited

U.S. PATENT DOCUMENTS 5,280,470 A * 1/1994 Buhrke et al. ................ 370/13
5,633,861 A * 5/1997 Hanson et al. .............. 370/232

FOREIGN PATENT DOCUMENTS

EP 0374928 A2 6/1990
EP 0712220 A1 5/1996

* cited by examiner

*Primary Examiner*—Chi Pham
*Assistant Examiner*—Alexander O. Boakye
(74) *Attorney, Agent, or Firm*—Sughrue Mion, PLLC

(57) ABSTRACT

The invention concerns a method of managing traffic for a virtual connection of a packet-based communications network, said method consisting in:
transmitting packets from source customer-premises equipment to destination customer-premises equipment;
time-division multiplexing the packets coming from the various source customer-premises equipment;
measuring the data-rate of the multiplexed packets;
temporarily storing the multiplexed packets in a queue;
transmitting the stored packets over the virtual connection;
determining a channel utilization factor related to the rate at which packets are transmitted over the virtual connection towards the destination customer-premises equipment; and
transmitting the channel utilization factor to data-rate management means so as to control the send information rate upstream from the multiplexing;
the channel utilization factor taking into account the length of the queue and the time taken to transmit the factor to the data-rate management means so as to prevent the queue from overflowing.

5 Claims, 3 Drawing Sheets

CONGESTION CONTROL AND TRAFFIC MANAGEMENT SYSTEM FOR PACKET-BASED NETWORKS

The present invention relates to packet-based networks, and more precisely to traffic management and congestion control for packet-based networks.

BACKGROUND OF THE INVENTION

A packet-based communications network makes provision to transmit packets between various nodes in a communications network. A packet comprises a group of bits, the group being of any fixed or variable size. Among examples of packet-based networks, there exist in particular: frame relay networks, in which a packet corresponds to a frame relay frame; cell-switching networks, e.g. asynchronous transfer mode (ATM) networks, in which a packet corresponds to an ATM cell; etc. A node may be defined as being a termination point for two or more channels or lines, and it generally includes control equipment.

Within a packet-based communications network, a virtual connection (VC) is set up between a source node and a destination node, and it generally passes through one or more intermediate nodes. A virtual connection is a logic connection (channel) between the source node and the destination node, enabling packets to be transmitted therebetween. Each node in the virtual connection acts as a packet interchanger for receiving a packet and sending it to its destination node. Each node in the communications network may be part of a diversity of virtual connections. The terminal nodes, such as the source node and the destination node, have interface cards that are necessary for receiving pre-formatted packets, and/or for correctly formatting the data contained in a conventional user data stream, so as to obtain packets, and/or to reassemble packets so as to obtain the conventional user data streams.

Packet-based communications networks are capable of combining a diversity of data such as local area network data, voice data, and image/video data into packets for the purpose of transmitting it over high-speed digital junctions. Each source node and each destination node is connected to various types of customer-premises equipment (CPE) such as a local area network, facsimile/modem equipment, voice equipment and image/video equipment, and other types of packet and/or data equipment for the purpose of transmitting corresponding packets via the communications network to a destination node.

In such packet-based networks, it is important to provide protocols suitable for managing traffic and for controlling congestion of packets travelling via a virtual connection. Various methods have been developed for controlling the rates at which packets are transmitted over a virtual connection, and also for controlling selective elimination of packets for the purposes of managing and controlling packet congestion.

One approach to managing and controlling packet congestion consists in a credit-based approach. The credit-based approach is a protocol which acts between adjacent nodes identified respectively as a "transmitter" and as a "receiver", in which protocol a packet is transmitted between a transmitter and a receiver only if the transmitter knows that the receiver can accept the information without losses. The receiver sends control information to the transmitter by indicating whether it is capable of accepting new packets. The credit-based approach does not rely on end-to-end signalling to cope with congestion. In such a credit-based approach, closed-loop control of the transmitter is implemented so that the data is sent as quickly as possible without data loss, from the transmitter to the receiver.

Another approach to managing congestion is an information feedback approach in which the state of congestion of the virtual connection is measured as the packets are flowing in a go direction, from the source node to the destination node, and the state of congestion as measured is sent back from the destination node to the source node so as to adjust the rate at which packets are sent over the network.

This approach is described in the Applicant's European Patent Application No. 0 719 012. Unfortunately, the teaching of that Application is not relevant to the problem with which the present invention is concerned.

OBJECTS AND SUMMARY OF THE INVENTION

The present invention concerns a system for managing traffic and for controlling congestion on a virtual connection of a packet-based communications network. In this system, the data-rate of a virtual connection is controlled from end to end, and utilization of network resources is maximized while limiting over-utilization thereof.

The invention is applicable to a management system comprising:

customer-premises equipment for delivering packets so that they can be transmitted over the virtual connection, and for receiving packets transmitted over said virtual connection;

a source node for accepting packets from a corresponding source item of customer-premises equipment, and for transmitting the packets along the virtual connection via the packet-based communications network at a variable send information rate;

a destination node for accepting packets transmitted in a go direction along the virtual connection from the source node to the destination node, for delivering the packets transmitted in a go direction to a corresponding destination item of customer-premises equipment, connected to the destination node, and for transmitting return packets in a return direction along the virtual connection from the destination node to the source node; and means for measuring a channel utilization factor which is directly related to the degree of utilization of the network resources while packets are being transmitted in the go direction, and for inserting the channel utilization factor into return packets travelling in the return direction;

in which system the source node includes means for controlling the send information rate in response to the channel utilization factor contained in the return packets.

More precisely, the invention provides a method of managing traffic for a virtual connection of a packet-based communications network, said method consisting in:

transmitting packets from source customer-premises equipment to destination customer-premises equipment;

time-division multiplexing the packets coming from the various source customer-premises equipment;

measuring the data-rate of the multiplexed packets;

temporarily storing the multiplexed packets in a queue;

transmitting the stored packets over the virtual connection;

determining a channel utilization factor related to the rate at which packets are transmitted over the virtual connection towards the destination customer-premises equipment; and transmitting the channel utilization factor to data-rate management means so as to control the send information rate upstream from the multiplexing;

the channel utilization factor taking into account the length of the queue and the time taken to transmit the factor to the data-rate management means so as to prevent the queue from overflowing.

This method thus consists in appropriately delivering network utilization information to a source so that the rate at which the source sends packets can be adjusted, the most relevant utilization information relating to a critical or access node of a virtual connection. If the network utilization information indicates that the resources of a virtual connection are under-utilized, the rate at which packets are sent over the virtual connection is increased. Conversely, if the network utilization information indicates that the resources of a virtual connection are over-utilized, the rate at which packets are sent into the network at the source node is decreased.

In this system, when a virtual connection becomes active, e.g. when a source node starts to transmit packets over the virtual connection, other active virtual connections reduce their utilization of excess network resources for the benefit of the virtual connection that has just become active, thereby enabling the resources to be allocated quickly and fairly between the active virtual connections. In addition, when the network utilization information indicates that a decrease in the rate at which the packets are sent over the network is necessary, the virtual connections in which utilization of the excess network resources is high undergo decreases in packet send rates that are larger than those undergone by the virtual connections in which utilization of the excess network resources is low.

BRIEF DESCRIPTION OF THE DRAWINGS

The system and the method implemented are better understood on reading the following description of FIGS. 1 to 6, in which.

MORE DETAILED DESCRIPTION

For the purpose of simplifying the description, the abbreviations given in the following table are used.

| ABBREVIATION | MEANING |
| --- | --- |
| ATM | Asynchronous Transfer Mode |
| CIR | Committed Information Rate |
| CMP | Congestion Monitoring Period |
| CPE | Customer-Premises Equipment |
| CUF | Channel Utilization Factor |
| ISR | Initial Send Rate |
| RTD | Round-Trip Duration |

-continued

| ABBREVIATION | MEANING |
| --- | --- |
| SIR | Send Information Rate |
| VC | Virtual Connection |

Figure 1:
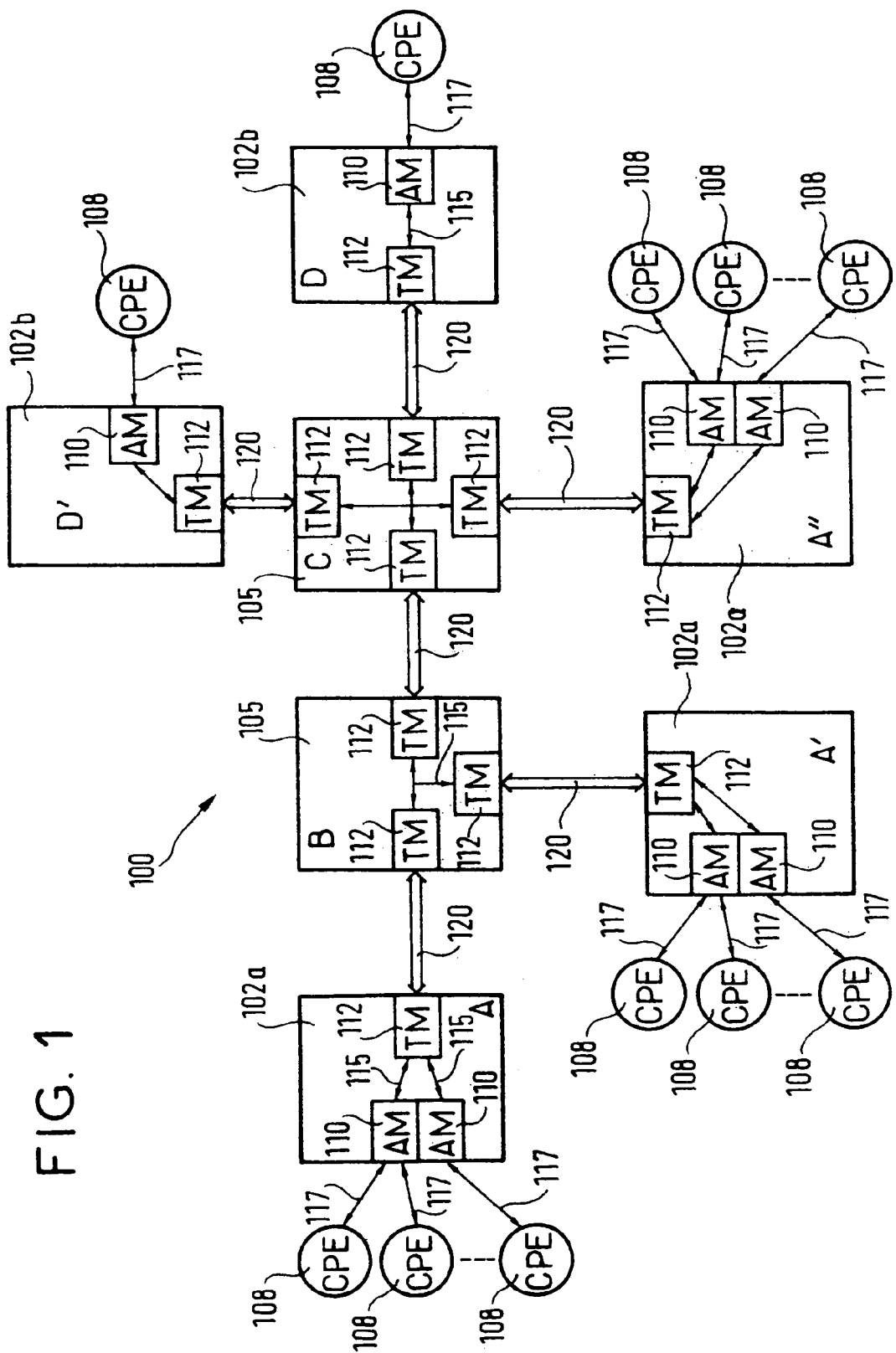
FIG. 1 is a block diagram of a packet-based communications network.

FIG. 1 is a block diagram of a packet-based communications network.

A packet-based communications network 100 includes a plurality of nodes comprising terminal or switching nodes 102 and intermediate nodes 105. As is well known in the art, in a packet-based communications network, packets are transmitted over a virtual connection from a source node 102a to a destination node 102b, generally passing through one or more intermediate nodes 105. The source node 102a and the destination node 102b are switching nodes 102 which serve as interfaces with customer-premises equipment (CPE) 108. Such customer-premises equipment 108 may comprise a local area network, voice equipment, image and video equipment, or other types of data and packet transmission equipment that deliver data in the form of packets which can then be transmitted via the packet-based communications network to a destination node.

The customer-premises equipment 108 is connected to a switching node 102 via an access module (AM) 110. The access module 110 serves as the interface with the customer-premises equipment 108 and executes the following functions: packet segmentation and reassembly, bandwidth acceptance and enforcement, data-rate control, congestion correction, alarm generation for congestion situations, and accounting and statistics file generation. The switching node 102 also includes a transit module (TM) 112 which executes the following functions: packet multiplexing, routing, signalling, congestion management, resource utilization measuring and reporting.

A switching network 115 interconnects all of the modules at a node. All the node components can take charge of a full-duplex call. For example, an access module can simultaneously switch packets from an access line 117 to the switching network 115, and vice versa.

Each of the intermediate nodes 105 includes a plurality of transit modules 112 interconnected by a switching network 115. Each of the transit modules 112 in an intermediate node 105 serves as an interface with a network pivot or junction line 120, and it executes all of the functions identified for the transit modules in the switching nodes 102. The transit modules 112 in the intermediate nodes 105 make provision to interconnect the network junction lines 120 via the switching networks 115 of the nodes 105.

Each virtual connection sets up a communications link between one of the source nodes 102a of the network and a corresponding destination node 102b of the network, via intermediate nodes 105. An example of a virtual connection is the connection between the source node A and the destination node D via the intermediate nodes B and C. Another virtual connection shown in FIG. 1 is the virtual connection between the source node A' and the destination node D' via the intermediate nodes B and C. Although all of the virtual connection shown in FIG. 1 utilize the intermediate nodes 105, a virtual connection may be set up directly between a source node 102a and a destination node 102b.

All of the node components within the communications network 100 can take charge of full-duplex calls. Therefore, a switching node may be a source node in one virtual connection and a destination node in another virtual connection. For example, a virtual connection may be set up between a source node A" and the destination node A' via the intermediate nodes C and B.

During calls over a virtual connection, data generated by the customer-premises equipment 108 is delivered via an access line 117 to an access module 110 in a source node 102a. The data may be formatted in the appropriate packet format by the customer-premises equipment 108 or, in another solution, the access module 110 may include a packet assembler/disassembler for correctly formatting the data delivered by the customer-premises equipment 108 so that it can be delivered to the communications network 100.

Figure 2:
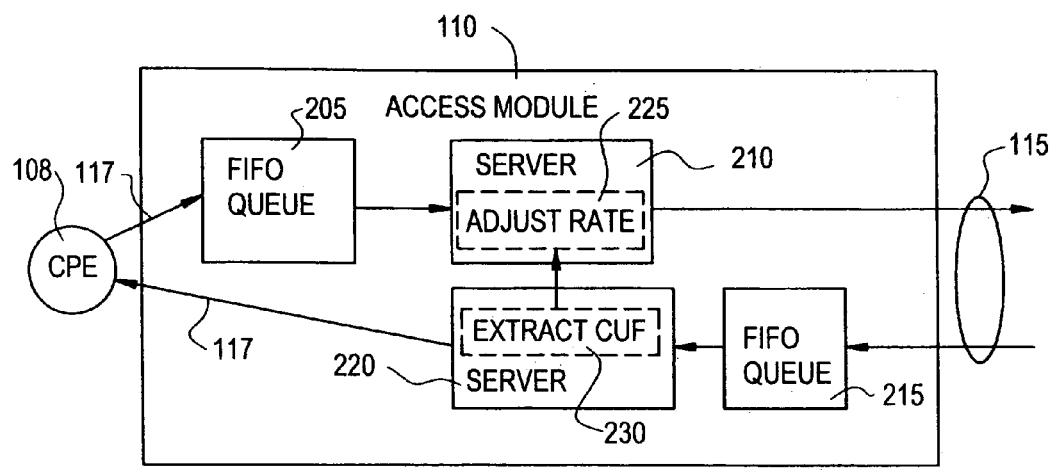
FIG. 2 is a block diagram of an access module contained in a source node or in a destination node of the FIG. 1 communications network.

FIG. 2 is a block diagram of an access module contained in a source node or in a destination node of the communications network shown in FIG. 1.

The customer-premises equipment 108 delivers data to the access modules 110 over the access lines 117. At least one dedicated virtual connection is set up for each item of customer-premises equipment 108 connected to the access module 110. Each of the virtual connections includes a queue 205 (constituted by a FIFO queue), in which queue the packets delivered by the customer-premises equipment 108 are initially stored, and a server 210 which controls delivering the packets from the queue to the transit module 112. If the information or data delivered by the customer-premises equipment 108 is not in a correct packet format ready to be delivered to the communications network, a packet assembler/disassembler may be provided for formatting the data delivered by the customer-premises equipment 108 in the appropriate packet format.

The various queues and the various servers associated with each of the virtual connections may be operated by a central processing unit (CPU) which includes storage and processing hardware suitable for performing the functions described above and below relative to the access module 110.

The data output by the server 210 is applied to a transfer module. It is also possible to provide a demultiplexer at the output of the server 110 if the access module 110 is connected to various transit modules.

For the opposite transmission direction, the access module 110 of the source node 102a also includes a queue 215 (also in the form of a FIFO queue) receiving data output by the transfer module situated upstream. As above, if the access module 110 is connected to a plurality of transfer modules, a multiplexer is placed at the input of the queue 215. The data output by the queue 215 is applied to a server 220 including extractor means 230 for extracting information, referred to as a "channel utilization factor" (CUF), transmitted in the flow of data addressed to the customer-premises equipment 108. The CUF information is delivered to rate-adjustment means 225 contained in the server 210 so that the rate at which the data is transmitted to the destination customer-premises equipment 108 (FIG. 1) is adjusted as a function of the CUF information, the access modules 110 serving to control the rate at which packets are sent into the network individually for each virtual connection, as explained below.

The CUF information is thus information transmitted in the direction opposite from that of the data to which the information applies. A CUF going to a module 110 managing customer-premises equipment 108 has an effect on the rate at which the data is transmitted between the access module 110 of said customer-premises equipment 108 and the destination customer-premises equipment 108.

Figure 3:
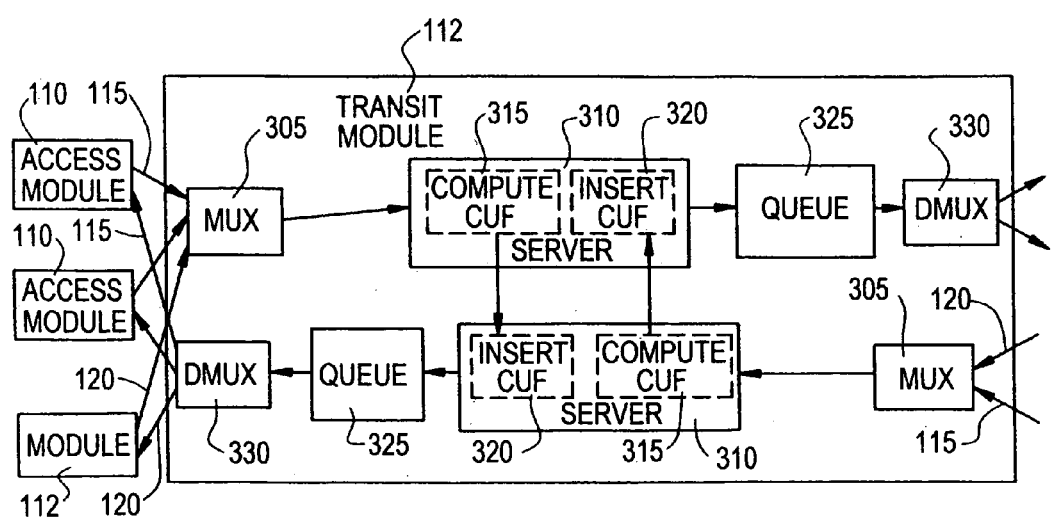
FIG. 3 is a block diagram of a transit module contained in a node of the FIG. 1 communications network.

FIG. 3 is a block diagram of a transit module 112 contained in a node of the communications network 100 shown in FIG. 1.

As shown in FIG. 1, within the source node 102a, within each of the intermediate nodes 105, and within the destination node 102b, the packets associated with each virtual connection are delivered to and from the switching networks 115 via a transit module 112. Each transit module 112 is disposed for the purpose of a full-duplex call between the switching network 115 and a network junction line 120.

In each transmission direction within a transit module 112, a multiplexer 305 multiplexes the received packets coming from access modules 110 (via network junction lines 115) or from other transit modules 112 (via network junction lines 120). The multiplexed packets are applied to servers 310, each of which includes CUF computing means 315, the computed CUFs being inserted into the packets transmitted in the other transmission direction. This is performed by insertion means referenced 320. The packets output by the servers are applied to queues 325 followed by demultiplexers 330. The demultiplexing is performed as a function of the addresses of the destinations of the packets (access module 110 or transit module 112), the addresses being written in the packets.

When a virtual connection is set up between a source node 102a and a destination node 102b, the connection possibly passing through one or more intermediate nodes 105, the packets initially travel along the virtual connection in a go direction, i.e. from the source node 102a to the destination node 102b. Within each node, the server 310 associated with the go direction of the virtual connection measures the channel utilization factor CUF, which is a measurement of the utilization of the critical resources, e.g. bandwidth, processing power, etc, while the packets are being transmitted in the go direction of the virtual connection. For example, an item of CUF information may be an eight-bit byte representing a percentage increase or decrease in data rate.

The utilization information is written packets travelling in the return direction (towards the source node) of the virtual connection by the server 310 associated with the return direction of the virtual path. In the absence of return traffic, the destination node generates a special empty packet making it possible to deliver utilization information to the source node.

As described in more detail below, the CUF information contained in the return packet traffic of a virtual connection is updated while the packets are being transmitted so that, when the return traffic reaches the source node, the CUF information contained in the return traffic expresses the maximum utilization level indicated by any one of the resources in the virtual connection. The CUF information provided is thus delivered to the source node as appropriately and effectively as possible.

The CUF information associated with resource utilization to which a packet travelling in the go direction is subjected does not travel with said packet over the entire length of the path going to the destination node. Instead, the current CUF information associated with a particular node is written directly in packets travelling in the return direction towards the source node. Specialists in the art can understand that, in a virtual connection, the first node (access node) encountered by the packets travelling in the go direction is generally the critical node and potentially the most limiting node (relative to utilization of resources) encountered by the packets in the virtual connection. The CUF information associated with the first node in the go direction is thus the most relevant information to deliver to the source node while packets are being transmitted by the source node over the virtual connection.

If the CUF information indicates that the resources on the virtual connection are under-utilized, the source node commands the virtual connection server 210 contained in the corresponding access module to increase the rate at which it is sending packets into the network. However, if the CUF information indicates that the resources on the virtual connection are over-utilized, the source node commands the virtual connection server 210 to decrease the rate at which it is sending packets into the network.

The period of time lying between two consecutive send-rate adjustments is selected in such manner as to enable the first adjustment to take effect throughout the network before the second adjustment takes place. This duration is selected to be equal to at least one round-trip duration (RTD) over the network. A round-trip duration over the network expresses the time required for a packet transmitted by a source node to reach the destination node and to return to the source node, via the virtual connection. By way of example, in a lightly loaded network, a typical RTD is approximately in the range 80 milliseconds to 100 milliseconds, and in a heavily loaded network, a typical RTD is approximately in the range 200 milliseconds to 250 milliseconds. These durations are functions in particular of the number of nodes, of the number of network connections, and of the length of the network, etc.

As described above, each virtual connection has a queue 205 and a server 210, the queue and the server being separate from each other, the rate at which the packets are sent by the server 210 being updated as a function of the information fed back from the network. The rate at which packets are sent into the network by a server 210 for a determined virtual connection is referred to as the send information rate (SIR). The SIR is updated as often as possible, but not within a lapse of time shorter than the round-trip time RTD over the network, except in the event of major congestion.

Figure 4:
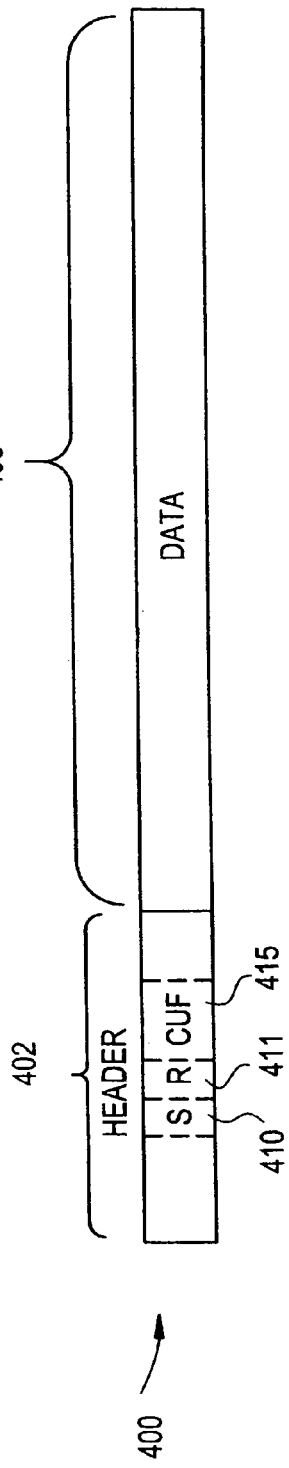
FIG. 4 is a diagram showing a packet having a header portion and a data portion.

With reference to FIGS. 2 and 4, each packet 400 has a header portion 402 and a data portion 405. The header portion 402 contains various required network information, such as routing, signalling, error or parity checking, and several other types of information known to specialists in the art. The data portion 405 contains data (information) to be transmitted from the source node 102a to the destination node 102b.

To measure the RTD along each virtual connection, each packet header portion 402 contains a send flag (S) 410 and a receive flag (R) 411. A group of packets sent into the network may be in the form of a burst of packets, or else the group may be a long stream of packets. When the access module 110 of the source module updates the SIR, it changes the value of the send flag 410, and places the new value of the send flag 410 in the headers 402 of all of the packets 400 in the group transmitted in the go direction.

In addition, the server 210 records the time at which the first packet of the group of packets was transmitted over the virtual connection. The time can be recorded in a memory register of the server 210, for example. The server 210 in the access module 110 of the destination node reads the send flag 410 of all of the packets 400 received for a determined virtual connection, and places it in the receive flag of all of the packets transmitted in the return direction. The access module 110 of the source node waits until it detects that the receive flag 411 of the packets received from the network for the determined virtual connection is equal to the send flag 410 of the packets corresponding to the time recorded in the memory register, whereupon the module is certain that at least one round-trip period has elapsed since the last update of the SIR. The RTD is measured as the time difference between the beginning of transmission of the group, i.e. the time recorded in the memory register, and the time of reception of the first return packet in the group.

Figure 5:
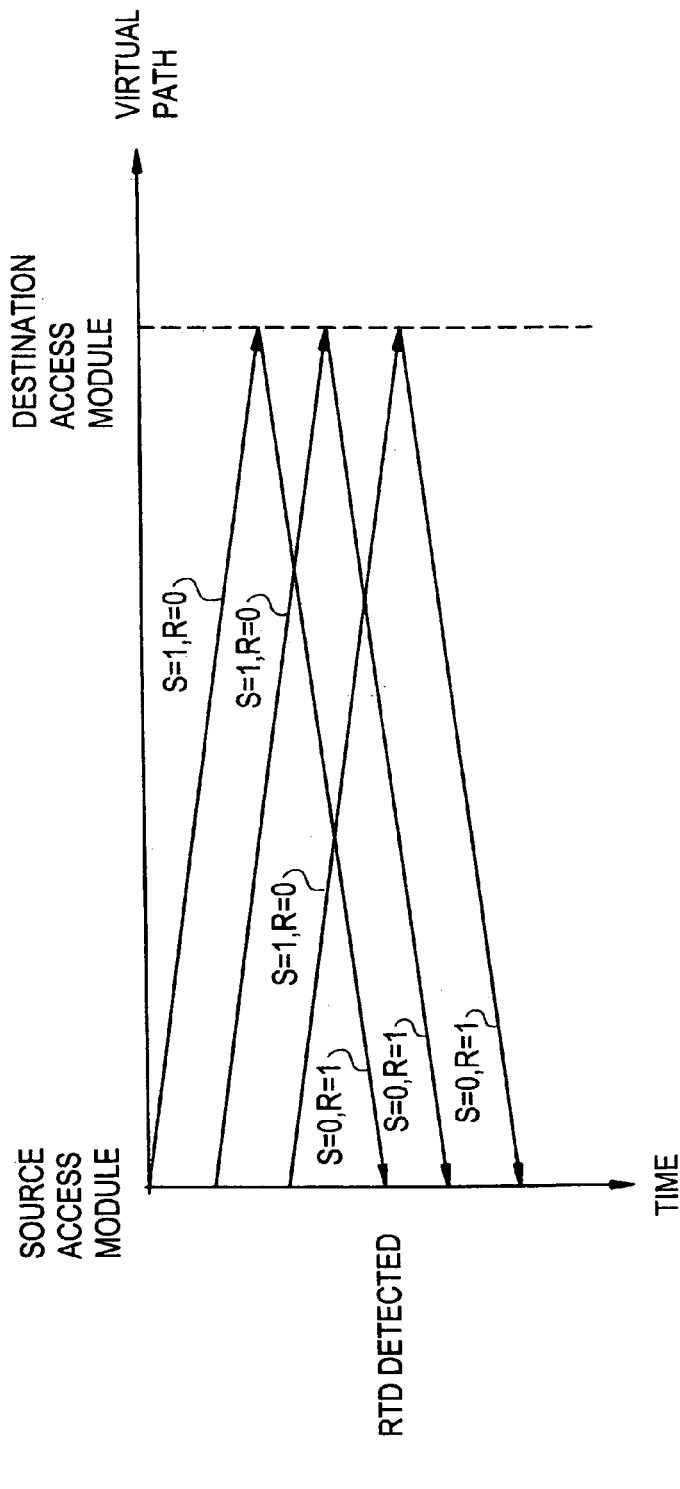
FIG. 5 is a diagram showing measurement of the time taken by a packet to travel over a round trip over the network.

Measuring the round-trip duration is better understood by means of an example. With reference to FIGS. 4 and 5, let us assume that a group of packets 400 delivered by the access module 110 of the source node (FIG. 1) contains a send flag 410 equal to 1 (S=1) and a receive flag 411 equal to 0 (R=0). Each packet 400 in the group then has an S bit equal to 1 and an R bit equal to 0. When the first packet 400 in the group reaches the access module 110 of the destination node (FIG. 1), the value of the send flag 410 in each packet is read by the server 210 (FIG. 2) and is placed in the receive flag 411 so that the receive flag of each packet is also set to 1 (R=1). Once the access module 110 of the source node (FIG. 1) detects that the receive flag 411 of the received packets is equal to the send flag 410 stored in the module, a round-trip duration is detected and a round-trip duration is determined as being the time difference between the moment of transmission and the moment at which the return packet is received by the module.

The RTD as measured expresses the current network load (or time) along the determined virtual connection. As a result, the SIR updates take place more frequently under light network load conditions. A high frequency of SIR updates accelerates the frequency of increases in processing capacity from end to end for all of the active virtual connections. Under heavy network load conditions, the SIR updates take place less frequently, thereby enabling data-rate adjustments to propagate and to take full effect throughout the network. This characteristic is useful for virtual connections that transmit traffic in bursts. Burst traffic creates a network load that is heavy and short-lived when it is placed on the virtual connection, and burst traffic is suitable for being transferred in deferred manner shortly afterwards. In this case, less frequent SIR updates enable the network to transfer immediately a large portion of the traffic burst via the virtual connection before the SIR of the virtual connection is suddenly increased.

As indicated above, the access module 110 of the source node of a virtual connection adjusts the SIR as a function of the CUF received from the network. The SIR is always greater than or equal to a committed information rate (CIR), and less than or equal to an excess information rate (EIR).

The CIR may be determined on the basis of the user subscription. For example, a user may subscribe to a CIR of 64 kilobits per second (Kbits/s) or to multiples thereof, e.g. going up to 10 megabits per second (Mbits/s).

The EIR may depend on the type of access line used. For example, if the access line is a T1 access line, the EIR is equal to 1.536 Mbits/s.

The CUF is the key factor in the traffic management system. It is the ratio between the network resource demand and the total available resources. The CUF is measured over a period of time referred to as the "congestion monitoring period" (CMP). The CMP is long enough to make it possible to perform accurate statistical measurement of the CUF, while being short enough to enable a plurality of CUF measurements to be performed per RTD. The network resources monitored are the processor power and the junction bandwidth. The CUF value indicated by each node corresponds to maximum processor utilization and to maximum junction utilization.

During a CMP, each transit module sums the total number of packets proposed (input and output) for a determined processor, and the total number of bytes proposed (output only) for a determined junction. At the end of a CMP, the processor utilization is calculated as the ratio between the total number of packets proposed and the maximum switching capacity of the processor. The junction utilization is calculated as the ratio between the total number of bytes proposed and the maximum bandwidth capacity of the junction. Since the CUF is a ratio between the load proposed and the available capacity, the CUF can be greater than 1.

With reference to FIG. 4, the CUF is encoded and placed in a CUF field 415 of the packet header 402. The CUF field 415 may, for example, represent values lying in the range 1% to 1000%.

With reference once again to FIG. 1, a single approach is provided for communicating the CUF values of the network 100 to the source node 102a.

Let us assume that a virtual connection is set up between the source node A and the destination node D via intermediate nodes B and C. As the packets travel from nodes A to D, all of the transit modules 112 along the virtual connection measure the processor utilization and the junction utilization. At the end of each CMP, each transit module inserts its CUF as measured into all of the packets travelling from nodes D to A only if the CUF as measured is greater than the CUF stored in the packet. As a result, the packets that reach the node A contain the maximum CUF encountered along the path in the go direction of the virtual connection. The access module 110 of the source node utilizes this information to adjust the SIR parameter of the virtual connection accordingly.

As described above, the utilization information is transmitted directly to the source node, thereby enabling the utilization information to reach the source node rapidly, the maximum time being equal to half the round-trip time over the network (RTD/2).

In addition to controlling the end-to-end data-rate as described above, provision is made to put the packets in queues for periods in which the network is overloaded. Queueing in the access modules 110 takes place for each individual virtual connection. The server 210 for each virtual connection queue 205 is utilized at a data-rate equal to the corresponding SIR. Queuing in the transit modules takes place for each individual junction. As a result, all of the virtual connections set up over a determined junction are put in a single queue. For this queue, the server is utilized at the junction data-rate.

In order to limit the time in the network end-to-end, and to detect impending congestion, the occupancy of each queue is constantly monitored and compared with a set of queue thresholds or congestions levels. For example, a transit module can monitor 9 congestion levels, level 0 corresponding to "no congestion" and level 8 corresponding to "major congestion". The intermediate congestion levels are communicated to the access modules 110 of the source node via the above-described CUF mechanism. As a result, the access modules reduce their SIRs appropriately to avoid congestion. If higher congestion levels occur, the transit module affected can use a special CUF option to force all of the virtual connections involved to reduce their SIR parameters to the CIR parameter.

The CUF information transmitted to the access module also takes into account the length of the queue, and the time required to transmit said information to the data-rate management means, so as to prevent the buffer memory from overflowing, when the multiplexed packet data-rate becomes lower than a given threshold value. This provision is made to remedy the following problem: if the data-rate over the virtual connections increases suddenly, the number of multiplexed packets (305, FIG. 2) also increases very rapidly. This can result in the queues 325 situated downstream from the multiplexers 305 overflowing, which gives rise to loss of packets.

Thus, the method of managing traffic of the invention as applied to a virtual connection of a packet-based communications network in which the packets coming from various items of customer-premises equipment are multiplexed prior to being stored temporarily in a queue, guarantees that packets transmitted over the virtual connection are not lost by the queue overflowing.

The invention proposes to prevent the queues 325 from overflowing by making sure that the channel utilization factors (CUFs) take into account, in particular, the lengths of the queues, when the multiplexed packet data-rate becomes less than a threshold value.

The channel utilization factor (CUF) is advantageously information that guarantees that the following relationship is satisfied:

$$\sum_i SIR_{i,t} \le k_{TM} * TR \qquad (1)$$

where $SIR_{i,t}$ is the rate at which the packets are sent into the network for a virtual connection i at time t, TR is a constant corresponding to the rate at which packets are transmitted over the virtual connection towards destination items of customer-premises equipment, and $k_{TM}$ is equal to:

$$k_{TM} = 1 + \frac{FIFO_{over}}{(RTD + CMP) * \lambda * TR} \qquad (2)$$

where $FIFO_{over}$ is the number of packets that can be stored in the queue, RTD is the time taken by a packet to make a round trip over the communications network, CMP is the time of measurement of the instantaneous data-rate over the virtual connection, and $\lambda$ is a constant greater than 1 taking into account the response times of the components of the communications network.

$k_{TM}$ corresponds to an overload factor related to the length of the queue 325.

The duration RTD+CMP corresponds to the time elapsed between a measurement of the data-rate over the junction 120 and the moment at which said data-rate is decreased.

In practice, the method of the invention may be implemented as follows:

At the input of the queue 325, a load MTFU is measured by the computing means 315. This measurement consists in counting the number of packets put in the queue:

$$MTFU = \frac{\text{number of packets} * \text{size of a packet}}{CMP * TR}$$

Each virtual connection VC contributes to loading the queue with a data-rate load $NLR_i$ equal to:

$$NLR_i = \frac{\text{number of packets} * \text{size of a packet}}{CMP}$$

This gives the following relationship:

$$\sum_i NLR_i = MTFU * TR$$

The load MTFU must be brought to a desired value TTL corresponding to a percentage (e.g. 80%) of TR.

If the load MTFU is less than TTL (e.g. MTFU=0.6*TR), the CUF information fed back is such that an increase in data-rate is authorized, within a limit of:

$$(0.8/0.6) * \sum_i SIR_{i,t}$$

The server 210 (FIG. 2) then increases its transmission rate.

If the load MTFU is greater than TTL (e.g. MTFU=1.1*TR), the CUF information fed back is such that a decrease in data-rate is necessary, within a limit of:

$$(0.8/1.1) * \sum_i SIR_{i,t}$$

The server 210 (FIG. 2) then decreases its transmission rate.

If the load MTFU is much less than TTL (e.g. MTFU=0.2*TR) and if a sudden increase in data-rate would result in the queue overflowing, then:

$$\sum_i SIR_{i,t} * (0.8/0.2 > k_{TM} * TR$$

In which case, the value of the CUF information fed back limits the data-rate increase authorization to a value $k_{TM}*TR$. Complying with this maximum data-rate makes it possible to ensure that the queue does not overflow. This gives:

$$\sum_i SIR_{i,t+CMP} = k_{TM} * TR$$

It should be noted (relationship 2) that the larger the queue and the smaller CMP, RTD, and TR, the higher the maximum permitted data-rate.

The factor λ of relationship 1 makes it possible to take into account the time required for convergence of the transmission functions and the response time of the system. Simulations have shown that a value λ equal to 2 is suitable.

As indicated above, the channel utilization factor (CUF) is usually inserted into packets transmitted towards the destination customer-premises equipment 108 so as to be intercepted at the server 220 contained in the access module 110 of said destination customer-premises equipment 108. In the absence of packets addressed to the destination customer-premises equipment 108, the channel utilization factor is transmitted in a special empty packet towards the destination customer-premises equipment 108.

The method of the invention is particularly applicable to frame relay networks and to ATM networks.

The invention claimed is:

1. A method of managing traffic for a virtual connection of a packet-based communications network, said method comprising the steps of:
    transmitting packets from source equipment to destination equipment;
    time-division multiplexing the packets from the source equipment;
    measuring the data-rate of the multiplexed packets;
    temporarily storing said multiplexed packets in a queue;
    transmitting said stored packets over said virtual connection;
    determining a factor related to the rate at which packets are transmitted over said virtual connection towards said destination equipment; and
    transmitting said factor to a data-rate management processor to control the rate at which the packets are sent upstream from said multiplexing, wherein said factor is based on the length of said queue and the time taken to transmit said factor to said data-rate management processor to prevent said queue from overflowing.

2. A method according to claim 1, wherein said factor satisfies the following relationship:

$$\sum_i SIR_{i,t} \leq k_{TM} * TR$$

where $SIR_{i,t}$ is the rate at which the packets are sent into the network for a virtual connection i at time t, TR is the rate at which packets are transmitted over the virtual connection towards the destination equipment, and $k_{TM}$ is equal to:

$$k_{TM} = 1 + \frac{FIFO_{OVER}}{(RTD + CMP) * \lambda * TR}$$

where $FIFO_{over}$ is the number of packets that can be stored in said queue, RTD is the time taken by a packet to make a round trip over said communications network, CMP is the time of measurement of the instantaneous data-rate over the virtual connection, and λ is a constant greater than 1 based on the response times of the components of said communications network.

3. A method according to claim 2, wherein λ is equal to 2.

4. A method according to claim 1, wherein said factor is inserted into the packets transmitted towards said destination customer-premises equipment.

5. A method according to claim 1, wherein said factor is transmitted in a special empty packet towards said destination customer-premises equipment in the absence of return traffic.

* * * * *